(12) United States Patent
Gammel et al.

(10) Patent No.: US 7,036,017 B2
(45) Date of Patent: Apr. 25, 2006

(54) MICROPROCESSOR CONFIGURATION WITH ENCRYPTION

(75) Inventors: Berndt Gammel, München (DE); Oliver Kniffler, München (DE); Holger Sedlak, Egmating (DE)

(73) Assignee: Infineon Technologies AG, Munich (DE)

( * ) Notice: Subject to any disclaimer, the term of this patent is extended or adjusted under 35 U.S.C. 154(b) by 362 days.

(21) Appl. No.: 10/160,967

(22) Filed: Jun. 3, 2002

(65) Prior Publication Data

US 2002/0169968 A1 Nov. 14, 2002

Related U.S. Application Data

(63) Continuation of application No. PCT/EP00/12065, filed on Nov. 30, 2000.

(30) Foreign Application Priority Data

Dec. 2, 1999 (EP) .................................. 99124134

(51) Int. Cl.
  *G06F 11/30* (2006.01)
  *G06F 12/14* (2006.01)
  *H04L 9/32* (2006.01)

(52) U.S. Cl. ...................... 713/189; 713/400; 713/194; 380/268; 380/274

(58) Field of Classification Search ................ 713/193, 713/501, 502, 322, 323, 600, 601, 189; 380/260, 380/262, 265, 278, 45, 274
See application file for complete search history.

(56) References Cited

U.S. PATENT DOCUMENTS

| 5,404,402 | A | * | 4/1995 | Sprunk ....................... 713/189 |
| 5,477,039 | A | * | 12/1995 | Lisimaque et al. ......... 235/380 |
| 5,542,055 | A | * | 7/1996 | Amini et al. ............... 710/306 |
| 5,682,474 | A | * | 10/1997 | Hsu ........................... 713/200 |
| 5,748,744 | A | * | 5/1998 | Levy et al. ................... 380/52 |
| 5,818,939 | A | * | 10/1998 | Davis ......................... 713/192 |

(Continued)

FOREIGN PATENT DOCUMENTS

DE 196 42 560 A1 4/1998

(Continued)

OTHER PUBLICATIONS

Bruce Schneier: "Applied Cryptography, Second Edition Protocols, Algorithms And Source Code in C", John Wiley & Sons, Inc, New York, 1996, pp. V, Vii-XV, 1-18, 44-47, 168-187, 189-211, 368-395, and 586-587.

*Primary Examiner*—Gilberto Barron, Jr.
*Assistant Examiner*—Samson Lemma
(74) *Attorney, Agent, or Firm*—Laurence A. Greenberg; Werner H. Stemer; Ralph E. Locher

(57) ABSTRACT

A microprocessor configuration includes a data bus for data transfer between functional units. On the bus side, each unit contains an encryption/decryption unit that is controlled synchronously by a random number generator. The configuration permits a relatively high level of security against monitoring of the data transferred via the data bus, with a feasible level of additional circuit complexity.

9 Claims, 1 Drawing Sheet

U.S. PATENT DOCUMENTS

| | | |
|---|---|---|
| 5,943,421 A | 8/1999 | Grabon |
| 5,944,833 A * | 8/1999 | Ugon .......................... 713/400 |
| 5,959,435 A * | 9/1999 | Ikegami ...................... 320/132 |
| 5,994,917 A | 11/1999 | Wuidart |
| 6,195,752 B1 * | 2/2001 | Pfab ........................... 713/168 |
| 6,209,098 B1 * | 3/2001 | Davis .......................... 713/194 |
| 6,704,872 B1 * | 3/2004 | Okada ........................ 713/194 |

FOREIGN PATENT DOCUMENTS

| | | |
|---|---|---|
| EP | 0 790 547 A1 | 8/1997 |
| EP | 0 887 723 A2 | 12/1998 |
| GB | 2 099616 A | 12/1982 |
| JP | 09-190339 | 7/1997 |
| JP | 10-055273 | 2/1998 |
| RU | 2 067 313 C1 | 9/1996 |
| RU | 2068602 C1 | 10/1996 |
| RU | 2 093 890 C1 | 10/1997 |
| RU | 2 097 931 C1 | 11/1997 |
| RU | 2 126 170 C1 | 2/1999 |
| RU | 10910 U1 | 8/1999 |

\* cited by examiner

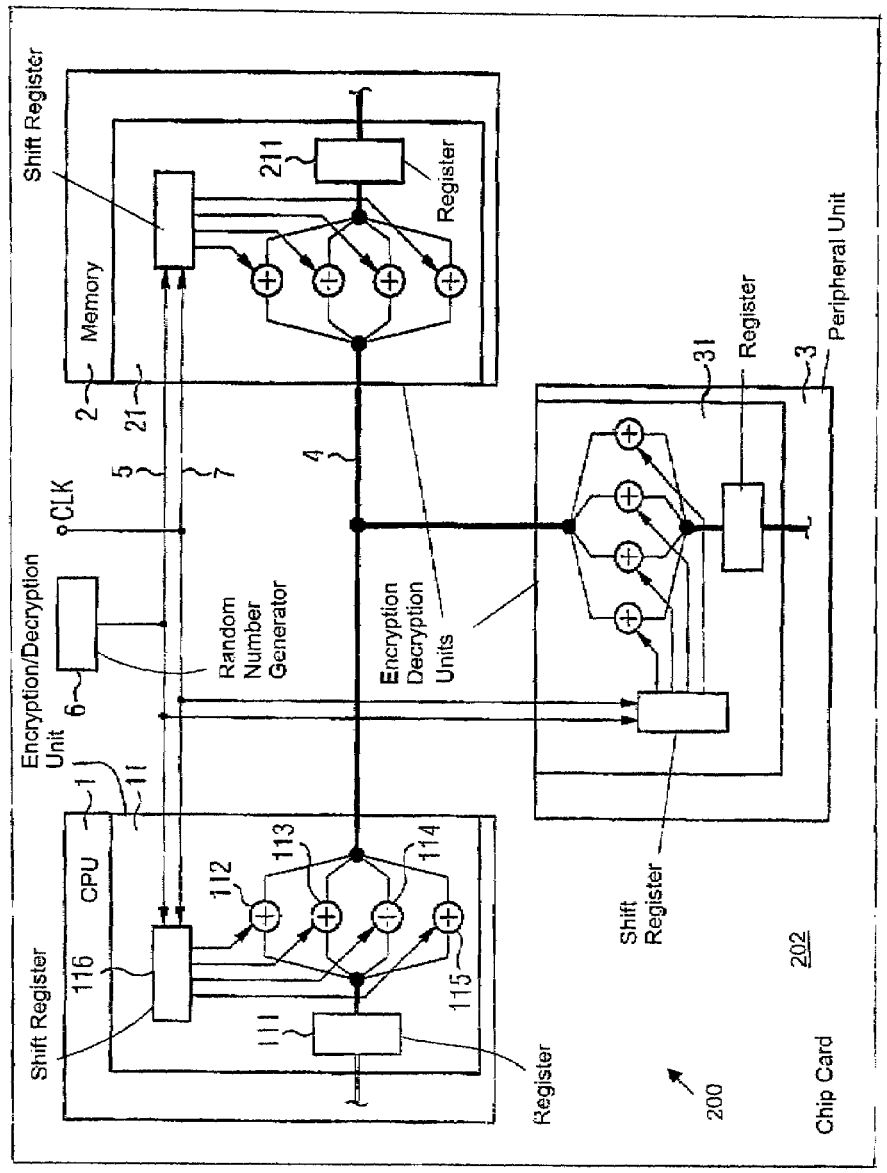

MICROPROCESSOR CONFIGURATION WITH ENCRYPTION

CROSS-REFERENCE TO RELATED APPLICATION

This application is a continuation of copending International Application No. PCT/EP00/12065, filed Nov. 30, 2000, which designated the United States and was not published in English.

BACKGROUND OF THE INVENTION

Field of the Invention

The invention relates to a microprocessor configuration having a microprocessor and a peripheral unit that are connected to one another by a data bus. The terminal connections of the bus are provided with cryptographic units.

Microprocessor configurations in which the data traffic passing via data buses is encrypted cryptographically are used in security-critical applications. By way of example, such microprocessor configurations are used as control circuits for mobile data medium cards, "chip cards". The data memory of the microprocessor configurations stores personalized data, monetary values, or access authorizations that are read by a reader which then enables a functional unit that is protected against unauthorized access operations.

Since the data traffic within the microprocessor configuration involves confidential data to which no unauthorized access must be possible, suitable protective measures are required. Unauthorized reading of the configuration's data memory or monitoring of the data traffic within the configuration could be achieved by probing, where thin needles are placed onto appropriate circuit parts and lines in order to tap off the processed signal flow during operation. On account of the relatively large parasitic capacitances, the driving of bus lines requires an increased current consumption in the circuits. A bus access operation is visible externally by virtue of a characteristic current profile. This can be used to draw conclusions about internal operating steps in the circuit. Under some circumstances, it would even be possible to ascertain the key for a cryptographic unit.

Protective measures against unauthorized reading of the content of data memories in a microcontroller for a chip card are described in Published German Patent Application DE 196 42 560 A1. The data memory stores security-related data in encrypted form. The data path between the memory and the CPU contains a decryption device, so that the decrypted original data can be processed in the CPU. When writing the data back to the memory, the data are encrypted again. In one variant embodiment, the decryption and encryption methods are executed in two stages. Accordingly, a respective encryption and decryption subunit is arranged in the vicinity of the memory, the respective peripheral units, and also in the vicinity of the CPU.

A problem is that the data traffic on the bus is available either in fully decrypted form or in partially decrypted form, depending on the variant embodiment. Probing would make it a relatively simple matter to monitor the data traffic passing via the bus. Additional, e.g. mechanical, measures would be necessary in order to provide effective protection against unauthorized tapping off.

SUMMARY OF THE INVENTION

It is accordingly an object of the invention to provide a microprocessor configuration which overcomes the above-mentioned disadvantages of the prior art apparatus of this general type.

In particular, it is an object of the invention to provide a microprocessor configuration that has increased security against unauthorized monitoring of the internal operations on the chip.

With the foregoing and other objects in view there is provided, in accordance with the invention, a microprocessor configuration, including: a central processing unit; at least one peripheral unit; a bus connecting the central processing unit to the peripheral unit; a first cryptographic unit configured in the peripheral unit, the first cryptographic unit being connected to the bus; a second cryptographic unit configured in the central processing unit, the second cryptographic unit being connected to the bus; and a random number generator for producing a succession of random values. The random number generator is coupled to the first cryptographic unit for supplying the random values thereto. The random number generator is coupled to the second cryptographic unit for supplying the random values thereto. The first cryptographic unit performs a cryptographic operation that is controlled based on the random values produced by the random number generator. The second cryptographic unit performs a cryptographic operation that is controlled based on the random values produced by the random number generator.

In accordance with an added feature of the invention, there is provided, a connection for supplying a clock signal that clock-synchronously controls the first cryptographic unit and the second cryptographic unit.

In accordance with an additional feature of the invention, the first cryptographic unit and the second cryptographic unit each include a shift register with feedback and an output. The shift register receives the random values produced by the random number generator. The first cryptographic unit and the second cryptographic unit each include a plurality of data signal paths and a plurality of combinational logic elements. Each one of the plurality of the combinational logic elements has an input connected to a respective one of the plurality of the data signal paths, an input connected to the output of the shift register, and an output connected to one of the plurality of the data signal paths.

In accordance with another feature of the invention, the shift register has linear feedback.

In accordance with a further feature of the invention, the central processor unit and the peripheral unit are monolithically integrated as an integrated circuit.

In accordance with a further added feature of the invention, the peripheral unit includes a memory cell array.

In accordance with yet an added feature of the invention, the central processing unit, the peripheral unit, the bus, and the random number generator are configured in a mobile data medium, such as a chip card.

The invention involves encrypting the data traffic that is output to the data bus by a functional unit of the microprocessor configuration and decrypting the data traffic at the input of the receiving unit. Encryption and decryption are controlled by a random number generator, so that the respective operating state of the encryption/decryption method cannot be predicted deterministically. This increases the security of the data traffic handled via the data bus. This means that mechanical measures that protect the bus lines against needle attacks, and are otherwise additionally necessary, are no longer required. The random control of the encryption/decryption method produces a correspondingly random current profile, which means that it is not possible to monitor the data traffic via the bus in this way.

In principle, the invention can be used for any microprocessor system in which the central processing unit (CPU) interchanges data and addresses with peripheral units, including memories, via a bus. The configuration can be both of discrete design and can be monolithically integrated on a single semiconductor chip, a "microcontroller".

Expediently, the random numbers for controlling encryption/decryption are supplied to the respective units clock-synchronously. To this end, a clock line is provided which connects all of the encryption/decryption units to one another. In addition, these units are connected to one another by a line on which the random numbers are forwarded. To increase security, it is recommended that the two lines just mentioned be protected against needle attacks by mechanical shielding measures. Corresponding protection for the multiplicity of the other data lines in the bus is dispensed with, however.

It is also possible for the random values for the key to be transferred to the cryptographic units via the bus and a control line. The separate line 5 is then no longer necessary. This allows not just the data bus, but also control signals, "bus states", to be transferred in encrypted form.

An encryption/decryption unit expediently contains a shift register with feedback, which is controlled by the common clock signal and by the serially supplied random number. The data word provided at the output of the shift register is logically combined with the data word that is to be output to the bus or that is received from the bus, for example, using an EXCLUSIVE-OR function. The shift register's feedback is preferably linear.

Other features which are considered as characteristic for the invention are set forth in the appended claims.

Although the invention is illustrated and described herein as embodied in a microprocessor configuration with encryption, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The sole drawing FIGURE shows a schematic illustration of a CPU, a memory, and another peripheral unit that are monolithically integrated on a microcontroller.

DESCRIPTION OF THE PREFERRED
EMBODIMENTS

The microcontroller 200 shown in the sole drawing FIGURE includes a central processing unit or CPU 1, a memory 2, and a peripheral unit 3. The peripheral unit 3 can be an input/output circuit block, for example. All of the components of the microcontroller 200 are integrated on a single silicon chip. The CPU 1 undertakes data control and arithmetic functions. The memory unit 2 contains data stored on a volatile or nonvolatile basis, and the peripheral unit 3 is used for the respective dedicated function assigned to it. Generally, the microcontroller 200 also contains other functional units. Data are interchanged between the units via a data bus 4. The data bus 4 includes a multiplicity of lines on which the data are transferred in parallel. The bus 4 also contains corresponding control lines for controlling the data transfer. A respective one of the cryptographic units 11, 21, 31 is arranged at the input and the output (which face the data bus) of each of the units 1, 2, 3. The data stream that is input or output to the respective unit via the data bus lines is decrypted and encrypted by the associated cryptographic unit.

By way of example, the CPU 1 requests a data word from the memory 2. The data word is read from the corresponding memory cells of the memory 2 and is buffer-stored in a register 211. The internal circuits of the cryptographic unit 21 encrypt the data word and output it to the bus 4. The cryptographic unit 11 of the CPU 1 receives this data word in order to decrypt it and to buffer-store it in the register 111. While the data word is being transferred on the bus 4 from the memory 2 to the CPU 1, only the encrypted data item is available. The encryption and decryption in the units 21 and 11 are performed on the basis of a random number provided by a random number generator 6 whose output is connected to the units 21, 11 via a line 5. The random number is supplied in the two units 21, 11 clock-synchronously using a clock CLK supplied in the two devices 21, 11 via a line 7. The random number generator 6 produces a (pseudo) random succession of bits which are supplied to the cryptographic units 21, 11 clock-synchronously using the clock CLK.

The random-number-based control of the encryption and decryption increases the data security for the data value that is being transferred via the bus 4, and protects the data value against unauthorized tapping off. The synchronous control ensures that encryption and decryption steps in the sending and receiving units in the same interval of time are complementary with respect to one another. The random nature of the encryption means that a different bit pattern appears on the bus despite data that are to be transferred being possibly repeated. The chip's current profile, which can be gauged relatively well externally on account of the bus's relatively high capacitive loads that are to be transferred, appears uncorrelated and random over time. This means that the current profile cannot be used for a reading attempt in order to identify any characteristic switching states of the microcontroller 200.

To increase security further, it suffices to protect just the lines 5 and 7 for providing the random numbers and the encryption/decryption clock against needle attack or probing. Conventional known measures can be used for this purpose. By way of example, the lines are covered with an additional layer whose removal destroys the lines and renders them unusable.

All three encryption/decryption units 11, 21, 31 shown are of correspondingly similar design. By way of example, the unit 11 is explained in more detail. In the vicinity of the CPU 1, the register 111 is used for buffer-storing the data word that is currently being received or being output by the CPU. The connection to the data bus applies a logic function to each of the data lines of the bus. In the example shown, the logic functions are EXCLUSIVE-OR functions 112, 113, 114, 115. One of the inputs and the output of each of the EXCLUSIVE-OR gates are connected into one of the lines of the data bus. The other one of the inputs is connected to a respective output of a shift register 116 which has linear feedback, for example. The input of the shift register 116 is connected to the clock line 7 and to the line 5 supplying the random numbers. The random number produced by the random number generator 6 is supplied serially via the line 5 to the shift register with feedback 116, while the clock control is effected by the clock CLK. The feedback for the shift register 116 ensures that the latter's output connections provide a different data word with each timing pulse. This data word is logically combined by the EXCLUSIVE-OR gates 112, . . . 115 with the respective data word that is to be output to the bus 4 or to be received from the bus 4. At the start, the shift registers are initialized using the same value. Since the other cryptographic units 21, 31 are of similar design, and their external connections are also connected in a corresponding manner, the data words transferred via the bus 4 are encrypted and accordingly decrypted in complementary fashion at the sending point and at the receiving point. The encryption and decryption are symmetrical with respect to one another. In principle, it suffices if the shift register 116 does not have feedback. The feedback increases protection. For the feedback, linear feedback based on a primitive polynomial is suitable. Depending on parallelism, a corresponding number of bits from the shift register is used for encryption. The sending and receiving ends perform the encryption/decryption clock-synchronously using the same random number. The symmetrical encryption means that the transfer is of no significance.

The circuit complexity for providing the random numbers, the clock, the shift register with linear feedback, the input/output register, and the EXCLUSIVE-OR gates are feasible. Measured against the additional complexity, the security against unauthorized monitoring of the data values transferred via the bus and against unauthorized gauging of the current profile is significantly increased, however. The microprocessor configuration 200 is advantageously constructed on a mobile data medium, such as a chip card 202.

We claim:

1. A microprocessor configuration, comprising:
   a central processing unit;
   at least one peripheral unit;
   a bus connecting said central processing unit to said peripheral unit;
   a first cryptographic unit configured in said peripheral unit, said first cryptographic unit being connected to said bus;
   a second cryptographic unit configured in said central processing unit, said second cryptographic unit being connected to said bus;
   a connection for supplying a regular clock signal clock-synchronously controlling said first cryptographic unit and said second cryptographic unit;
   a random number generator for producing a succession of random values, said random number generator being coupled to said first cryptographic unit for supplying the random values thereto, said random number generator being coupled to said second cryptographic unit for supplying the random values thereto;
   the random values being supplied to said first cryptographic unit and to said second cryptographic unit clock-synchronously under the control of said clock signal;
   said first cryptographic unit performing a cryptographic operation being controlled based on the random values produced by said random number generator;
   said second cryptographic unit performing a cryptographic operation being controlled based on the random values produced by said random number generator; and
   said peripheral unit and said central processing unit both functioning as transmitting units and receiving units, and data is transmitted via said bus in an encoded manner by a respective transmitting unit and the data is decoded by a respective receiving unit.

2. The microprocessor configuration to claim 1, wherein: said first cryptographic unit and said second cryptographic unit form an operational pair including an encryption device and an associated decryption device.

3. The microprocessor configuration to claim 1, wherein: said first cryptographic unit and said second cryptographic unit for an operational pair including an encryption device and an associated decryption device.

4. The microprocessor configuration according to claim 1, wherein:
   a cryptographic unit, selected from the group consisting of said first cryptographic unit and said second cryptographic unit, includes:
      a shift register with feedback and an output, said shift register receiving the random values produced by said random number generator,
      a plurality of data signal paths, and
      a plurality of combinational logic elements,
      each one of said plurality of said combinational logic elements having an input connected to a respective one of said plurality of said data signal paths, an input connected to said output of said shift register, and an output connected to one of said plurality of said data signal paths.

5. The microprocessor configuration according to claim 4, wherein said shift register has linear feedback.

6. The microprocessor configuration according to claim 1, wherein said central processor unit and said peripheral unit are monolithically integrated as an integrated circuit.

7. The microprocessor configuration according claim 1, wherein said peripheral unit includes a memory cell array.

8. The microprocessor configuration according to claim 1, comprising:
   a mobile data medium;
   said central processing unit, said peripheral unit, said bus, and said random number generator being configured in said mobile data medium.

9. A microprocessor configuration, comprising:
   a central processing unit;
   at least one peripheral unit;
   a bus connecting said central processing unit to said peripheral unit;
   a first cryptographic unit configured in said peripheral unit, said first cryptographic unit being connected to said bus;
   a second cryptographic unit configured in said central processing unit, said second cryptographic unit being connected to said bus;
   a connection for supplying a regular clock signal clock-synchronously controlling said first cryptographic unit and said second cryptographic unit, said connection being a clock line connecting said first cryptographic unit and said second cryptographic unit to each other;
   a random number generator for producing a succession of random values, said random number generator being coupled to said first cryptographic unit for supplying the random values thereto, said random number generator being coupled to said second cryptographic unit for supplying the random values thereto;

the random values being supplied to said first cryptographic unit and to said second cryptographic unit clock-synchronously under the control of said clock signal;
said first cryptographic unit performing a cryptographic operation being controlled based on the random values produced by said random number generator;
said second cryptographic unit performing a cryptographic operation being controlled based on the random values produced by said random number generator; and
said peripheral unit and said central processing unit both functioning as transmitting units and receiving units, and
data being transmitted via said bus in an encoded manner by a respective transmitting unit and the data being decoded by a respective receiving unit.

* * * * *